United States Patent

Weitala et al.

[15] 3,636,799
[45] Jan. 25, 1972

[54] APPARATUS FOR STRIPPING INSULATION FROM STRANDED ELECTRICAL CABLE

[72] Inventors: Larry R. Weitala, West Allis; Ronald G. Anderson, Milwaukee, both of Wis.

[73] Assignee: Allis-Chalmers Manufacturing Company, Milwaukee, Wis.

[22] Filed: Mar. 3, 1970

[21] Appl. No.: 16,190

[52] U.S. Cl. ............................................................81/9.51
[51] Int. Cl. .................................................................H02g 1/12
[58] Field of Search..................81/9.51, 9.5 R; 219/221, 233, 219/68

[56] References Cited

UNITED STATES PATENTS

| 1,351,186 | 8/1920 | Nelson | 81/9.51 |
| 1,595,799 | 8/1926 | Massingham | 81/9.51 |
| 2,393,919 | 1/1946 | Lucarelle et al. | 81/9.51 |

FOREIGN PATENTS OR APPLICATIONS

| 386,568 | 1/1933 | Great Britain | 81/9.51 |

Primary Examiner—Theron E. Condon
Assistant Examiner—Roscoe V. Parker, Jr.
Attorney—Lee H. Kaiser, Robert B. Benson and Thomas F. Kirby

[57] ABSTRACT

Insulation is stripped from a multiple wire strand electrical cable by urging a pair of opposed, heated stripping blades having blunt edges against the cable insulation to thermally deteriorate the insulation, rotating the stripping blades, and pulling the cable in a longitudinal direction away from the stripping blades. The heated stripping blades penetrate the insulation but are sufficiently blunt so that they do not nick the wire strands of the cable.

5 Claims, 6 Drawing Figures

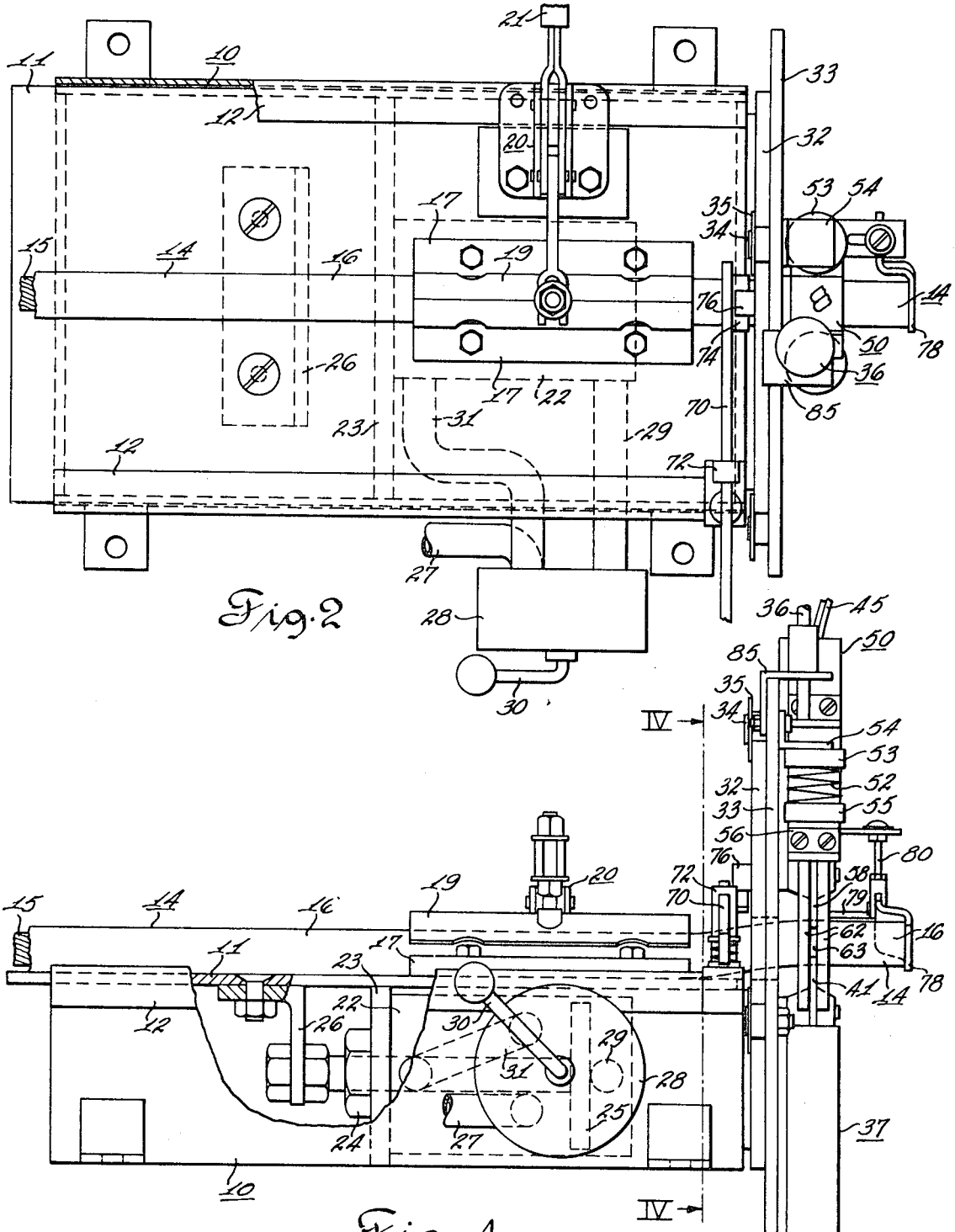

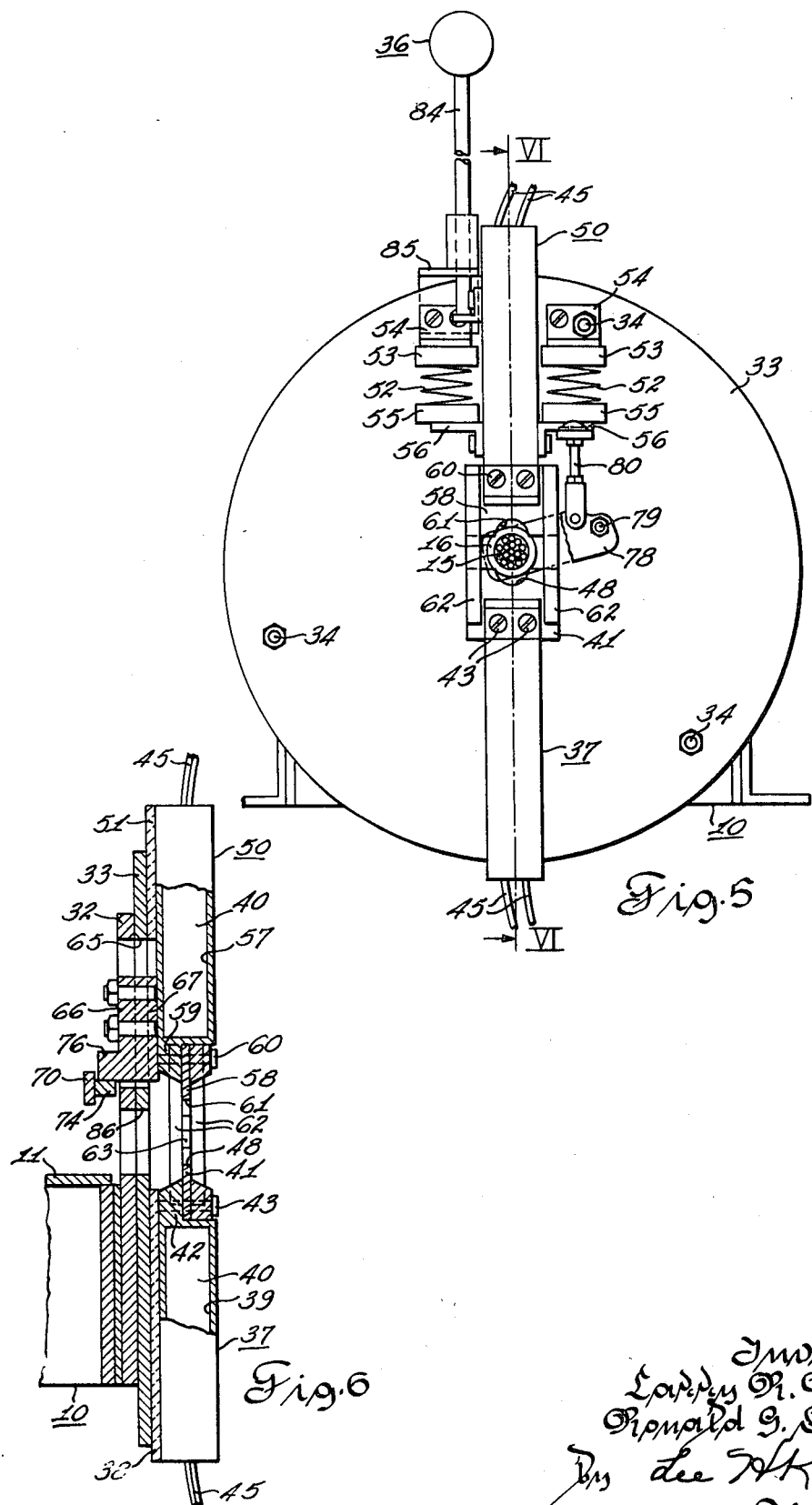

APPARATUS FOR STRIPPING INSULATION FROM STRANDED ELECTRICAL CABLE

This invention relates to apparatus for stripping insulation from electrical cable and in particular to such apparatus for stripping insulation from multiple wire strand cable.

Apparatus having opposed knife blades for severing insulation and stripping the severed length of insulation from an electrical cable is well known, but such apparatus is generally unsatisfactory for multiple wire strand electrical cable covered with the tough plastic insulation such as polyvinyl chloride and cross-linked polyethylene which have high tensile strength. Such insulation often has an irregular wall thickness and extends between the wire strands on the outer periphery of the cable, and when knife blades are used to penetrate and strip the insulation, the knife blades frequently nick the wire strands with the consequence that the strands are easily broken in use.

It is an object of the invention to provide an improved method and apparatus for stripping insulation from multiple strand cable.

This and other objects and advantages of the invention will be more easily understood from the following detailed description when considered in conjunction with the accompanying drawing wherein:

FIGS. 1, 2, 3 and 5 are elevation, plan, left end and right end views respectively of a preferred embodiment of the invention, FIG. 1 being partly in section;

FIG. 6 is a view taken along FIG. VI—VI of FIG. 5.

Figure 3:
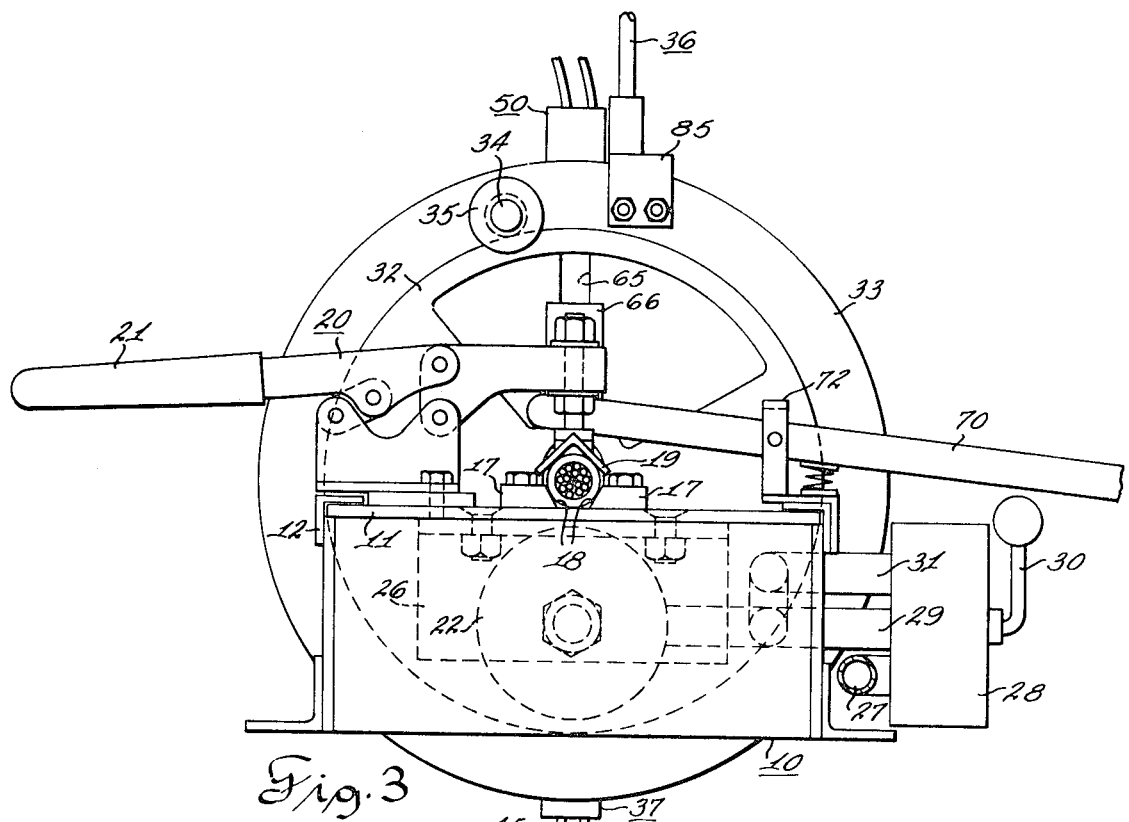
Figure 4:
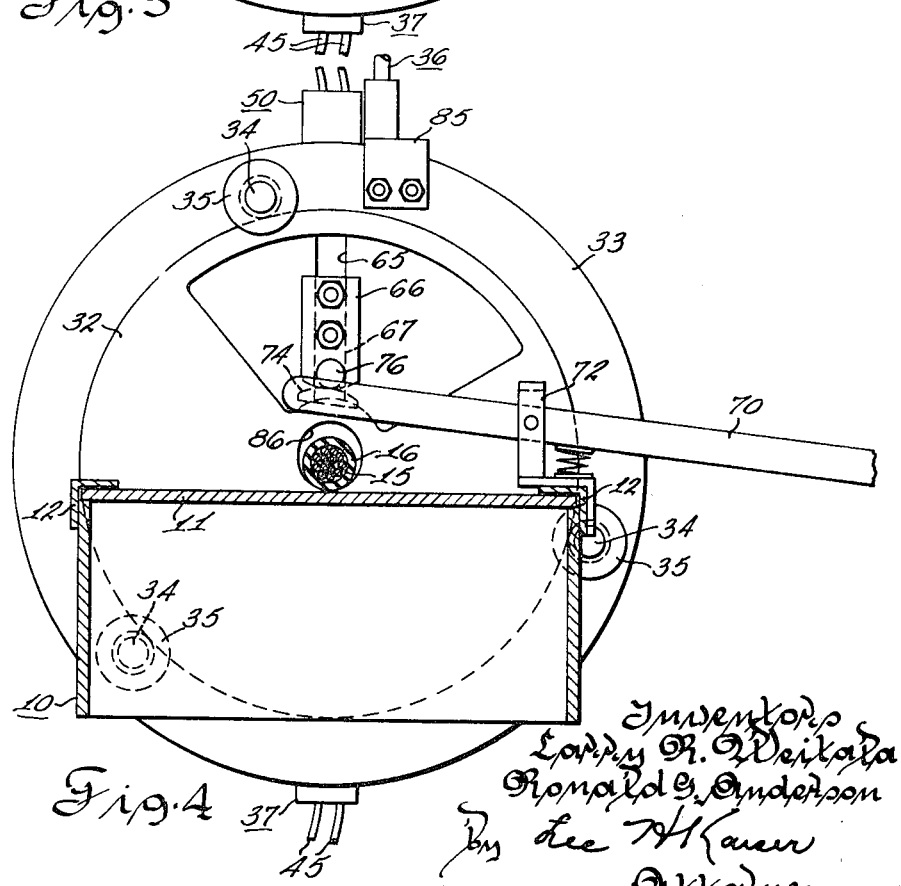
FIG. 4 is a view taken along FIG. IV—IV of FIG. 1.

Referring to the drawing, a preferred embodiment of the invention has a generally rectangular base 10 and a flat movable table 11 supported on and reciprocable longitudinally of base 10 within inverted L-shaped guides 12 secured by suitable means to the sides of base 10. A length of cable 14 having a multiple wire strand conductor 15 covered by thermally deteriorable, or degradable insulation 16 may be rigidly held on movable table 11 by suitable clamping means of the bench clamp type shown as having spaced-apart elongated members 17 bolted to table 11 and provided with sloping sides 18 (see FIG. 3) between which cable 14 is disposed and an inverted V-shaped jaw 19 movable toward and away from table 11 by a manually operated toggle mechanism 20 to grip cable 14 at four points about its periphery. When handle 21 of toggle mechanism 20 is lifted upwardly, V-shaped jaw 19 is raised from table 11 to release cable 14.

Table 11 may be moved longitudinally of base 10 by an air cylinder 22 secured to a transverse member 23 of base 10 by suitable means shown as a nut 24. The piston 25 of air cylinder 22 is secured to an L-shaped bracket 26 affixed to the bottom surface of table 11. A source of compressed air available from a conduit 27 may be connected by a valve 28 to a conduit 29 leading to one end of air cylinder 22 to move piston 25 and table 11 longitudinally of base 10. Valve 28 may be operated by a handle 30 to a first position wherein it supplies compressed air over conduit 29 to air cylinder 22 to move table 11 in a direction away from the stripping blades and may also be actuated by handle 30 to a second position wherein it supplies compressed air over a conduit 31 to the other end of air cylinder 22 to retract the table 11.

A circular support member, or bearing member 32 may be affixed to one end of base 10 by suitable means such as welding so that it is disposed in a vertical plane. A flat circular blade carrier, or cutting head 33 is mounted for rotation on circular support member 32 by a plurality of arcuately spaced-apart bearing rods 34 which extend through blade carrier 33 adjacent its outer margin and have circumferential flanges 35 which overlap the edges of circular support member 32. A handle 36 is secured to cutting head 33 to permit manual rotation thereof. A fixed lower blade support 37 is rigidly secured to blade carrier 33 with thermally insulating material 38 therebetween and has an axially extending recess 39 adapted to receive a self-contained electrically insulated, cartridge resistance element 40. A lower stripping blade 41 is positioned against a radial extension 42 at the radially inner end of lower blade support 37 and is releasably secured thereto by screws 43 so that blade 41 is heated by resistance element 40 when this element is energized over conductors 45 from a source of electrical power. Lower stripping blade 41 may have a circular, cutout portion 48 which conforms to the circumference of the multiple strand conductor 15 of cable 14.

A radially extending upper blade support 50 is supported on blade carrier 33 with insulation 51 therebetween so as to be movable radially relative to lower blade support 37 and is resiliently urged in a radially inward direction by a pair of compression springs 52 disposed on opposite sides of upper blade support 50. Cup-shaped members 53 fitting over the radially outer end of springs 52 abut against L-shaped brackets 54 affixed to blade carrier 33 adjacent its outer margin, and cup-shaped members 55 fitting over the radially inner end of springs 52 abut against L-shaped brackets 56 affixed to upper blade support 50 so that springs 52 urge upper blade support 50 in a radially inward direction. Upper blade support 50 has an axially extending recess 57 adapted to receive a self-contained, electrically insulated, cartridge resistance element 40. A metallic upper stripping blade 58 may be positioned against a radially inward extending portion 59 on upper blade support 50 and be releasably secured thereto by screws 60 so that blade 58 is heated by resistance element 40 when this element is electrically energized over conductors 45. Upper stripping blade 58 may have a circular cutout portion 61 which conforms to the circumference of the multiple strand conductor 15 of cable 14. Adjacent its outer edges, upper stripping blade 58 may have depending, spaced-apart legs 62 provided with elongated slots 63 in a vertical plane which receive the edges of lower stripping blade 41 and guide it as blades 41 and 58 are reciprocated relative to each other. The legs 62 mechanically reinforce the lower blade 41 against the forces exerted against it when table 11 is reciprocated to pull the cable 14 in a longitudinal direction away from the stripping blades.

A radially extending guide slot 65 is provided through blade carrier 33. A connecting member 66 having an elongated guide portion 67 reciprocable radially within guide slot 65 is affixed to upper blade support 50 at one side of blade carrier 33 and has at the other side of blade carrier 33 outwardly extending flanges which overlap blade carrier 33.

A manually operable blade separating lever 70 is fulcrumed on base 10, i.e., it is pivotally mounted between its ends on a pivot pin extending through post 72 affixed to base 10 and has an actuating cam portion 74 at one end extending parallel to the axis of blade carrier 33 and disposed beneath a cam follower abutment 76 on connecting member 66. It will be appreciated that manual depression of the free end of lever 70 will bring actuating cam portion 74 into engagement with cam follower abutment 76 and thus move connecting member 66 and upper blade support 50 in a radially outward direction to separate upper and lower blade supports 37 and 50 and thus move upper stripping blade 58 radially away from fixed lower stripping blade 41.

A stop 78 may be pivotally mounted on a bracket 79 affixed to cutting head 33, and the end of the cable 14 is abutted against stop 78 to determine the length of insulation 16 to be stripped. An actuating rod 80 pivotally connected at one end to stop 78 at a point spaced from the axis of rotation of stop 78 and connected at its upper end to upper blade support 50 lifts stop 78 to a position shown in dotted lines in FIG. 5 where it interferes with cable 14 when blade-separating lever 70 is manually depressed to move upper blade support 50 radially outward to permit insertion of cable 14 between stripping blades 41 and 58. When lever 70 is released, the springs 52 move upper blade support 50 radially inward and translate actuating rod 80 to pivot stop 78 downward from its interfering position so that the severed length of insulation 16 can fall free.

Handle 36 is affixed at one end of an elongated rod 84 that extends through a clearance hole in a bracket 85 affixed to cutting head 33 and bears against upper blade support 50 to permit the operator to manually exert pressure radially inward against upper blade support 50 in addition to the force provided by springs 52.

In accordance with the invention, the stripping blades 41 and 58 have blunt, or dull edges so that they do not nick the wire strands of conductor 15 when they are rotated relative to cable 14. For example, the edges of the blades 41 and 58 at the cutout portions 48 and 61 may be flat and have a width approximately equal to the diameter of the wire strands of the cable.

In operation, blade-separating lever 70 is manually depressed to move upper stripping blade 58 away from the fixed lower blade 41, and a length of cable 14 is placed on table 11 so that one end protrudes through axial aperture 86 in cutting head 33 and is manually clamped to table 11 by toggle clamp 20. The cable insulation 16 rests in the cutout portion 48 in lower blade 41, and when lever 70 is released, springs 52 urge the cutout portion 61 in upper stripping blade 58 against the insulation 16 on cable 14. The stripping blades 41 and 58 have been heated by resistance elements 40 and urged together by springs 52 so that they thermally deteriorate and penetrate the insulation 16 on cable 14. Cutting head 33 may then be rotated manually through an angle such as 45° in both directions from its normal position by means of handle 36. Rotation of the heated opposed blades 41 and 58 severs the insulation down to the wire strands of conductor 15, but the blunt stripping blades 41 and 58 do not nick the wire strands. Valve 28 is then actuated by handle 30 to operate air cylinder 22 and move table 11 in an axial direction away from cutting head 33, and the cable 14 clamped on table 11 pulls against the stripping blades 41 and 58 which have penetrated and partially severed the insulation 16 to break apart the remaining threads of insulation between the strands which have not been parted by rotation of heated stripping blades 41 and 58. Table 11 is preferably reciprocated through a distance equal to at least twice the length of insulation 16 to be stripped from cable 14 to assure that the stripped length falls free.

Different stripping blades 41 and 58 having cutout portions 48 and 61 may be substituted when it is desired to strip insulation from cable of a different size.

Although the preferred embodiment is disclosed with a clamped cable and rotating stripping blades, it will be appreciated that the invention can also be practiced by rotating the cable relative to fixed heated blunt stripping blades. Further, although the disclosed invention finds its principal utility with multiple strand cable having insulation which deteriorates under heat, it will be appreciated that the invention is also operable with single strand cable and with cable having other types of insulation such as rubber.

It should be understood that we do not intend to be limited to the particular embodiment shown and described for many modifications and variations thereof will be obvious to those skilled in the art.

The embodiments of the invention in which an exclusive property or privilege is claimed are defined as follows:

1. Apparatus for stripping a length of thermally deteriorable insulation from a multiple wire strand cable comprising, in combination,
    a pair of stripping blades having opposed, sufficiently blunt stripping edges so that they will not nick the wire strands of said cable when pressed against and moved across said strands,
    means for urging said stripping blades toward each other and against the insulation of said cable when said cable is inserted between said stripping edges,
    means for heating said stripping blades,
    means for clamping said cable in a position so that a length thereof may be inserted between said stripping blades,
    means for rotating said clamping means and said stripping blades relative to each other, and
    means for moving said clamping means and said stripping blades relative to each other in a direction axial of said cable.

2. Apparatus for stripping a length of thermally deteriorable insulation from a multiple strand cable, comprising, in combination,
    a rotatable stripping blade carrier,
    a pair of stripping blades having sufficiently blunt stripping edges so that they will not nick the strands of said cable when pressed against and moved across said strands,
    means for mounting said stripping blades on said rotatable carrier so that they are movable relative to each other in a radial direction and said blunt edges are opposed and including resilient means for urging said pair of stripping blades toward each other and against the insulation of said multiple strand cable when it is inserted between said blunt stripping edges,
    means for heating at least one of said blades, and
    means for clamping said cable in coaxial relation to said rotatable carrier with a length thereof inserted between said opposed stripping blades, said means for clamping and said carrier being movable relative to each other in a direction parallel to the axis of said cable.

3. Apparatus in accordance with claim 2 wherein said means for clamping includes a member disposed adjacent said rotatable carrier with a cable-receiving surface thereof parallel to said axis of rotation of said carrier and said apparatus also includes fulcrumed lever means for operatively engaging one of said blades and moving it in a radially outward direction to separate said pair of blades.

4. Apparatus for stripping a length of thermally deteriorable insulation from a multiple strand cable comprising, in combination,
    a base,
    a circular support affixed to said base,
    a stripping blade carrier rotatably mounted on said circular support,
    a pair of hollow blade supports,
    means for mounting said blade supports on said rotatable carrier so that they are movable radially relative to each other and including spring means for resiliently urging said blade supports toward each other,
    a pair of stripping blades having stripping edges each of which is affixed to one of said blade supports so that said stripping edges are opposed, said stripping edges being sufficiently blunt so that they will not nick the wire strands of said cable when pressed against and moved across said strands,
    resistance element means disposed in said hollow blade supports for heating said stripping blades,
    lever means fulcrumed on said base selectively operable to engage one of said blade supports and move it in a radially outward direction to separate said stripping blades, and
    means for clamping said cable on said base with its axis coincident with the axis of rotation of said blade carrier and a length thereof inserted between said opposed stripping blades.

5. Apparatus in accordance with claim 4 wherein said means for clamping includes
    a cable-supporting member mounted on and reciprocable relative to said base with a surface parallel to said axis of rotation,
    a clamp on said cable-supporting member, and
    air cylinder means selectively operable to reciprocate said cable-supporting member relative to said base in a direction parallel to said axis of rotation and away from said blade carrier.

* * * * *